US006662711B2

(12) United States Patent
Maeda

(10) Patent No.: US 6,662,711 B2
(45) Date of Patent: Dec. 16, 2003

(54) COOKING APPARATUS

(75) Inventor: Kazunori Maeda, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/354,399

(22) Filed: Jan. 30, 2003

(65) Prior Publication Data

US 2003/0140797 A1 Jul. 31, 2003

(30) Foreign Application Priority Data

Jan. 31, 2002 (JP) .................................... P. 2002-023038

(51) Int. Cl.[7] ............................ A23L 1/00; A47J 37/00; H05B 6/64; H05B 6/80

(52) U.S. Cl. ............................ 99/341; 99/467; 99/451; 99/DIG. 14; 219/740; 219/756

(58) Field of Search .......................... 99/339, 341, 340, 99/337, 338, 400, 401, 444–450, 467, 476, 451, DIG. 14; 219/685, 678, 756, 754, 702, 681, 739, 734, 763, 732, 506, 405, 411, 399, 417, 740; 426/523, 571, 570

(56) References Cited

U.S. PATENT DOCUMENTS 3,098,924 A * 7/1963 Slton et al. ................. 219/387
3,119,000 A * 1/1964 Loch et al. ................. 219/413
3,736,398 A * 5/1973 Jarvis ......................... 219/737
4,598,693 A * 7/1986 Koziol ...................... 126/41 R
4,761,529 A * 8/1988 Tsisios ........................ 219/685
5,436,434 A * 7/1995 Baird ......................... 219/734
5,839,356 A * 11/1998 Dornbush et al. ............ 99/341
5,896,808 A * 4/1999 Graur .......................... 99/341
5,907,994 A * 6/1999 Dotan ......................... 99/341
5,992,301 A * 11/1999 Mukumoto .................. 99/341
6,054,699 A * 4/2000 Kim et al. .................. 219/756
6,199,473 B1 * 3/2001 Dotan et al. .................. 99/341
6,448,540 B1 * 9/2002 Braunisch et al. .......... 219/685

FOREIGN PATENT DOCUMENTS

JP 6-75430 9/1994

* cited by examiner

*Primary Examiner*—Timothy F. Simone
(74) *Attorney, Agent, or Firm*—Pearne & Gordon LLP

(57) ABSTRACT

A protective screen (5) is provided near a peephole part (7) of a door main body (2) and has its heat resisting temperature higher than the heat resisting temperature of a window frame. Even when a material to be cooked ignites, flame hardly goes outside from the peephole part (7). A temperature switch (3) does not need to be provided in a heating chamber (1). Accordingly, the cooking apparatus can be easily designed.

4 Claims, 5 Drawing Sheets

COOKING APPARATUS

BACKGROUND OF THE INVENTION

The present invention relates to a cooking apparatus, and more particularly to the structure of a door of a microwave oven.

A cooking apparatus of this kind has been hitherto provided with, as shown in FIGS. 4 and 5, a door main body 2 on the front surface of a heating chamber 1 and a temperature switch 3 on the upper surface of the heating chamber 1. In the conventional cooking apparatus, when a material 4 to be cooked ignites in the heating chamber 1 due to an abnormal heating, the temperature switch 3 opens a circuit owing to the rise of temperature. Then, the temperature switch stops the operation of the cooking apparatus (for instance, refer to a JP-B-6-75430). On the door main body 2, a protective screen 5 made of glass or a resin is provided to prevent foreign materials from entering the heating chamber 1 so as not to cause a failure and fixed to the door main body 2 by a window frame 6. On the door main body 2, a peephole part 7, which is formed at a conductive material such as metal plates to reflect microwaves, is provided to recognize the state of the material to be cooked in the heating chamber 1. The temperature switch 3 sets an installed position and operating temperature so that the temperature switch 3 can stop the operation of the cooking apparatus before the protective screen 5 of the door is broken due to heat caused by an ignition in the heating chamber 1 when the material 4 to be cooked ignites and flame extends outside and spreads to combustible materials such as furniture, curtains, etc. located near the cooking apparatus. In the heating chamber 1, a door switch holding means 9 for holding door switches 8*a* and 8*b* is provided. To the door main body 2, a door switch operating means 10 is attached to freely slide so that the cooking apparatus operates only when the door main body 2 closes.

However, in the conventional cooking apparatus, the operation of the cooking apparatus needs to be stopped as soon as possible before the protective screen 5 is broken, when the material 4 to be cooked ignites. Therefore, the setting temperature of the temperature switch 3 is desirably low as much as possible. When the quantity of the material 4 to be cooked is small, however, high frequency energy is hardly absorbed to the material 4 to be cooked to raise the temperature of a wall surface in the heating chamber 1. Accordingly, the temperature of the temperature switch 3 inconveniently rises even under an ordinary heating state to stop the cooking apparatus even during cooking. In order to prevent the temperature switch 3 from operating under the ordinary heating state, the setting temperature needs to be raised. In this case, however, the operation of the cooking apparatus cannot be quickly stopped upon ignition, and it is difficult to appropriately set the setting temperature of the temperature switch 3.

Further, the temperature switch 3 needs to be operated before the protective screen 5 or the window frame 6 is deformed and the flame in the heating chamber 1 goes outside the cooking apparatus. A material having high heat resisting temperature needs to be selected for the protective screen 5 and the window frame 6. Accordingly, the cooking apparatus is designed with difficulty.

The door switch holding means 9 likewise needs to have high heat resisting temperature in order to prevent the door switches 8*a* and 8*b* from being deformed due to the ignition of the material 4 to be heated and not operating normally. It is also difficult to set the operating temperature of the temperature switch 3.

SUMMARY OF THE INVENTION

For solving the above-described problems, according to the present invention, the heat resisting temperature of a protective screen is higher than the heat resisting temperature of a window frame and a peephole part is provided near the protective screen.

According to the present invention, when a material to be cooked ignites, since a distance between the peephole part or peep window part and the window frame is adequately small, as soon as flame enters this space, oxygen in the space necessary for combustion is consumed. Further, since the distance is small, the supply of oxygen from a periphery can be delayed. Further, since the heat resisting temperature of the protective screen is high, a situation that the protective screen is broken and oxygen necessary for combustion is supplied does not arise. Therefore, the flame hardly extends outside from the peephole part. Besides, owing to the same reason, since the supply of oxygen not only to the space between the peephole part or peep window part and the protective screen, but also to a heating chamber can be delayed. Accordingly, the combustion of the material to be cooked can be stopped in the heating chamber. Since a temperature switch does not need to be provided in the heating chamber, the cooking apparatus can be easily designed.

A cooking apparatus of the present invention comprises a heating chamber for housing a material to be cooked; a door main body attached to the heating chamber so as to freely open and close; a peephole part provided in the door main body to recognize the state of the material to be cooked in the heating chamber; a protective screen provided to prevent foreign materials from entering the heating chamber through the peephole part to cause a failure; and a window frame for fixing the protective screen to the door main body. The protective screen has its heat resisting temperature higher than that of the window frame and is provided near the peephole part.

The protective screen has high heat resisting characteristics and the peephole part is provided near the protective screen. Accordingly, when the material to be cooked ignites, since a distance between the peephole part and the window frame is adequately small, as soon as flame enters this space, oxygen in the space necessary for combustion is consumed. Further, since the distance between the peephole part and the protective screen is small, the supply of oxygen from a periphery can be delayed. Further, since the heat resisting temperature of the protective screen is high, a situation that the protective screen is broken and oxygen necessary for combustion is supplied does not arise. Therefore, since the flame can be interrupted by the protective screen and hardly extend outside from the peephole part, a temperature switch does not need to be attached and the cooking apparatus can be easily designed.

Further, according to the present invention, since the superposed margin of the protective screen and the peephole part is longer than the space between the protective screen and the peephole part, even when the material to be cooked ignites, the flame is evaded by the protective screen. Still further, since a distance to the window frame is long so that heat is hardly transferred to the window frame, the heat resisting temperature of the window frame can be lowered. Besides, the supply of oxygen not only to the space between the peephole part or peep window part and the protective screen, but also to the heating chamber can be delayed. Accordingly, the combustion of the material to be cooked can be stopped in the heating chamber and the cooking apparatus can be easily designed.

Further, the cooking apparatus of the present invention comprises a heating unit for heating the material to be cooked; door switches for opening and closing a circuit for supplying electric power to the heating unit; a door switch holding unit for holding the door switches to the heating chamber; a door switch operating unit attached to the door main body so as to freely slide and a heat sensitive part provided in the door switch holding unit. When the material to be cooked ignites, the heat sensitive part is deformed more rapidly than at least either the protective screen or the window frame so that the door switches operate and the heating unit stops. Accordingly, since a temperature switch is not needed, the cooking apparatus can be designed with ease.

DETAILED DESCRIPTION OF THE PREFERRED EMBODIMNETS

Figure 1:
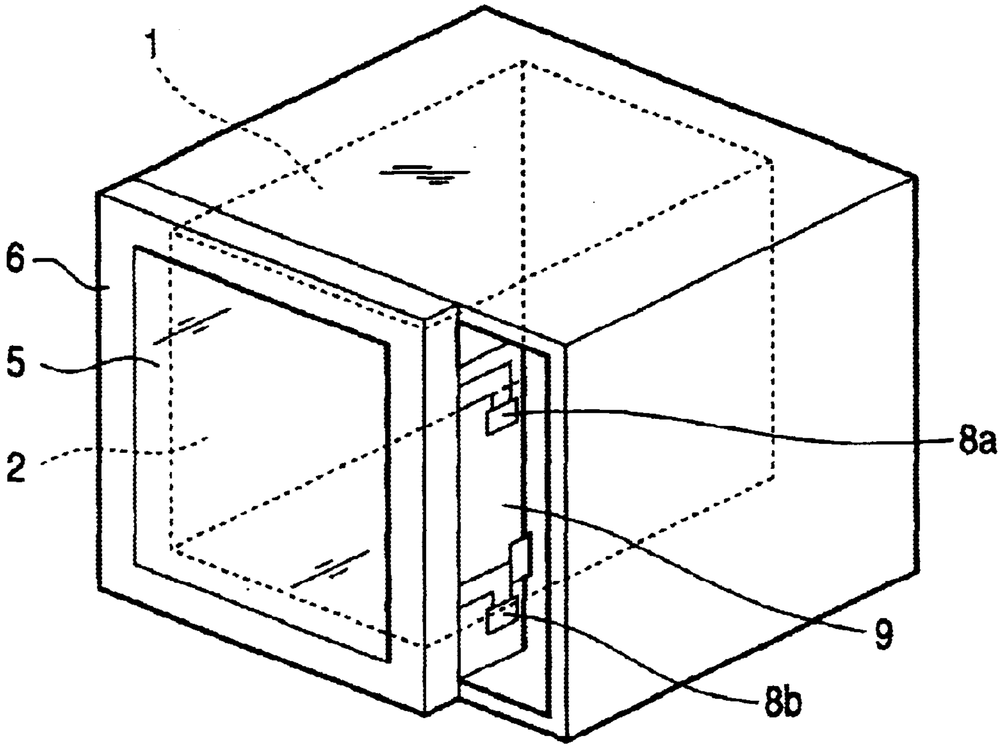
FIG. 1 is a perspective view of a cooking apparatus according to one embodiment of the present invention.

Now, an embodiment of the present invention will be described by referring to the drawings.

(Embodiment 1)

Figure 2:
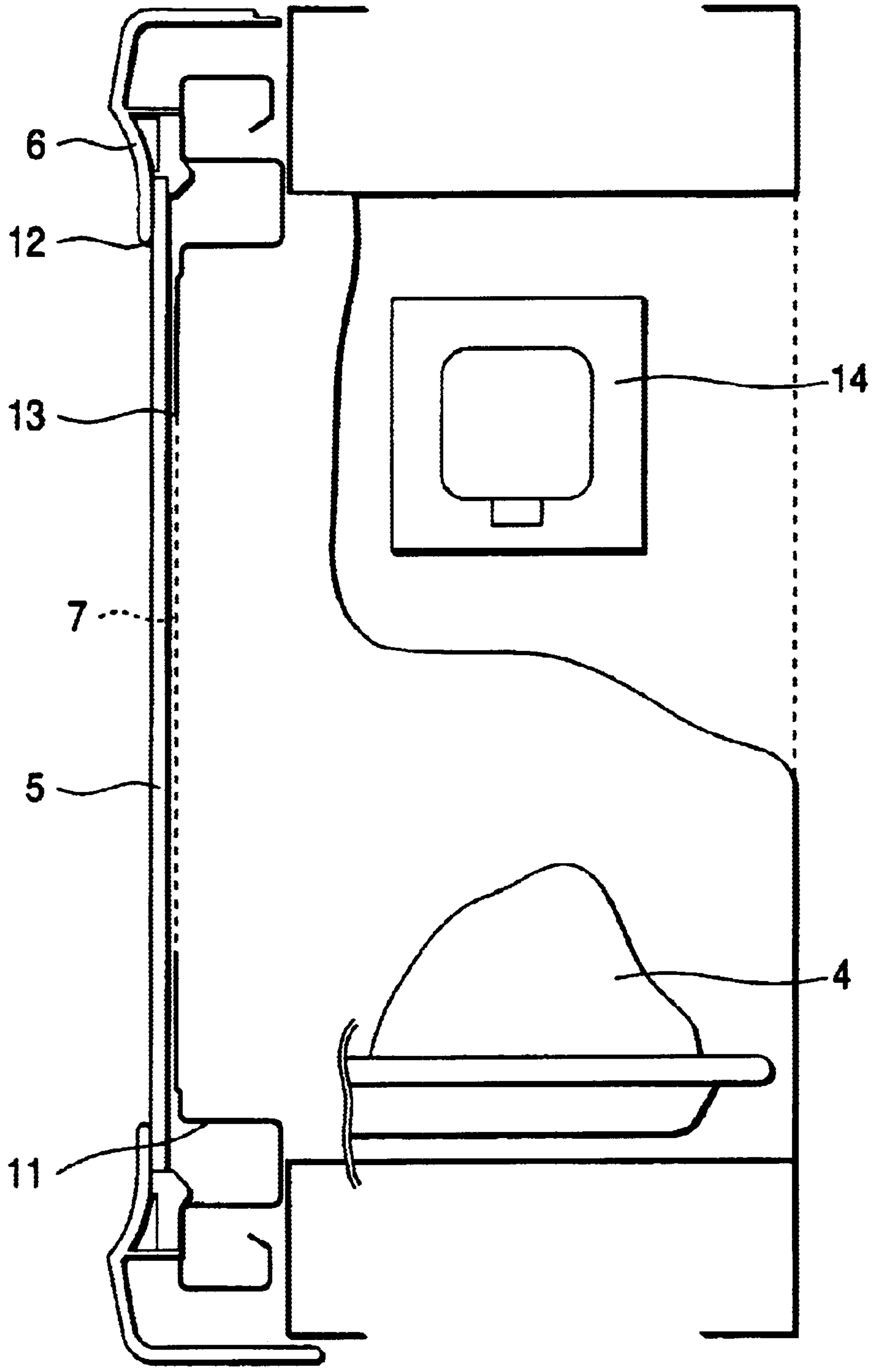
FIG. 2 is a sectional view of main parts of the cooking apparatus.
Figure 3:
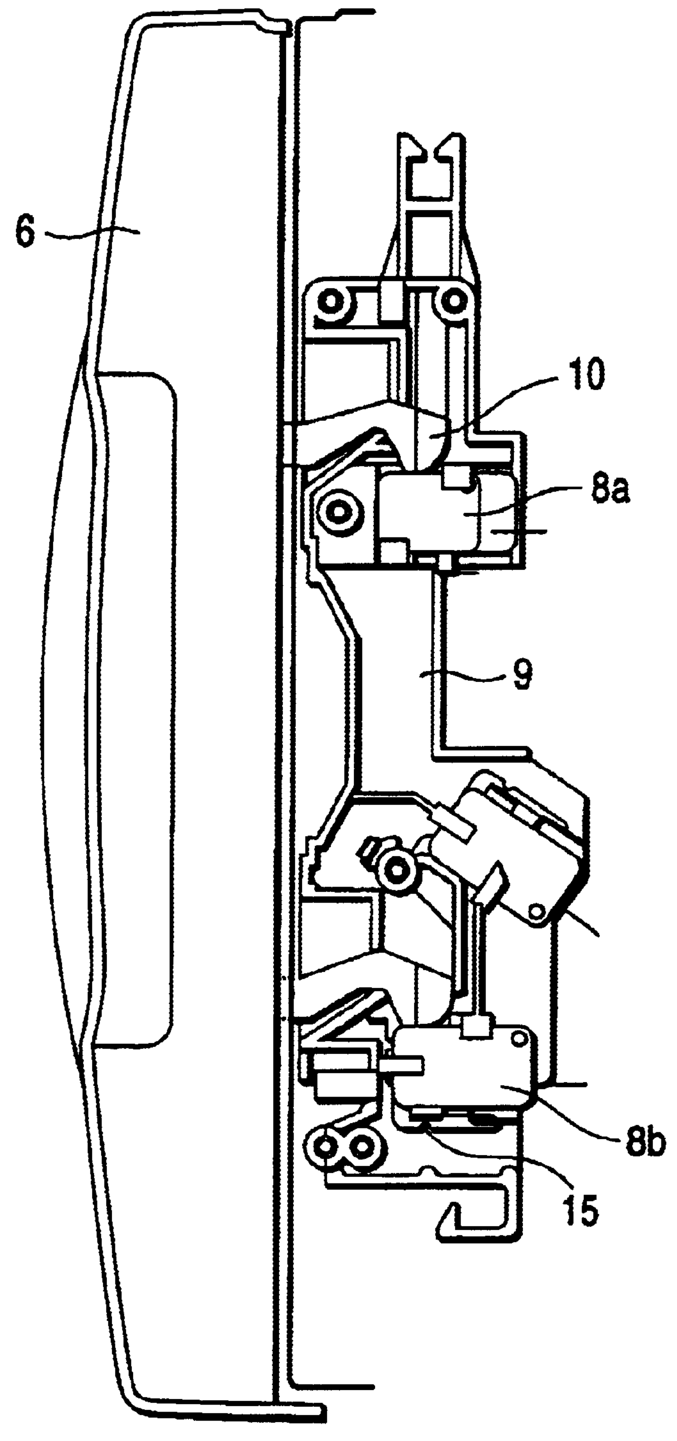
FIG. 3 is a sectional view of main parts of the cooking apparatus.
Figure 4:
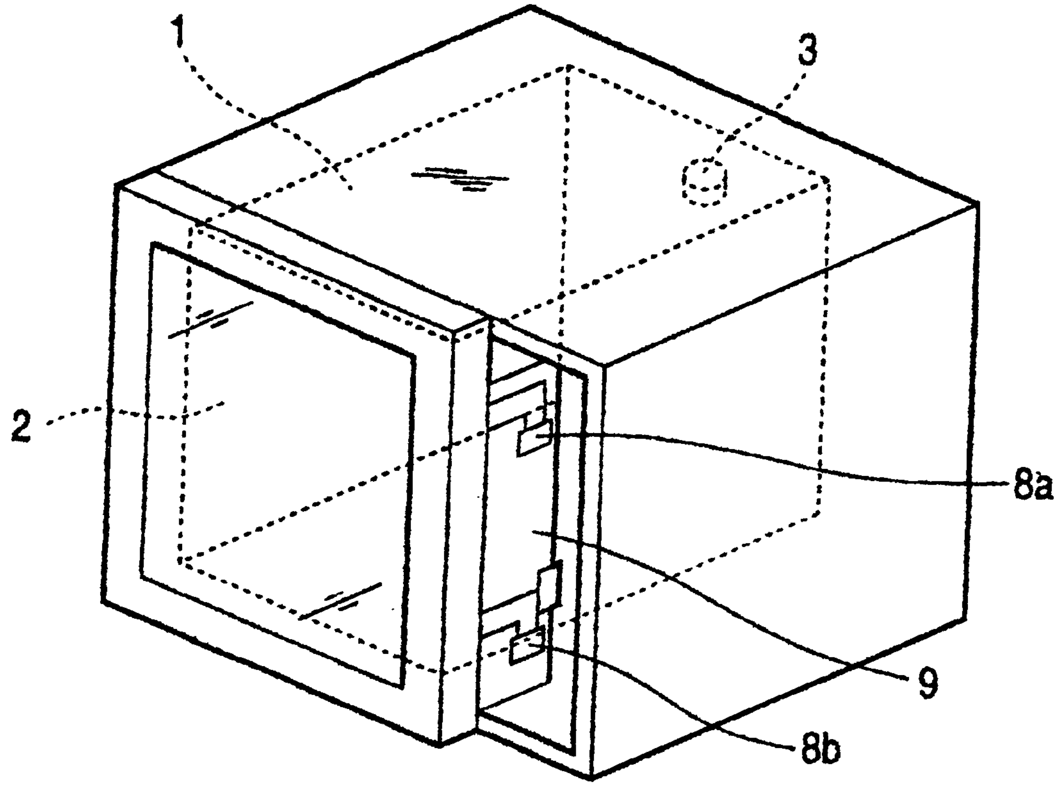
FIG. 4 PRIOR ART
FIG. 4 is a perspective view of a conventional cooking apparatus.
Figure 5:
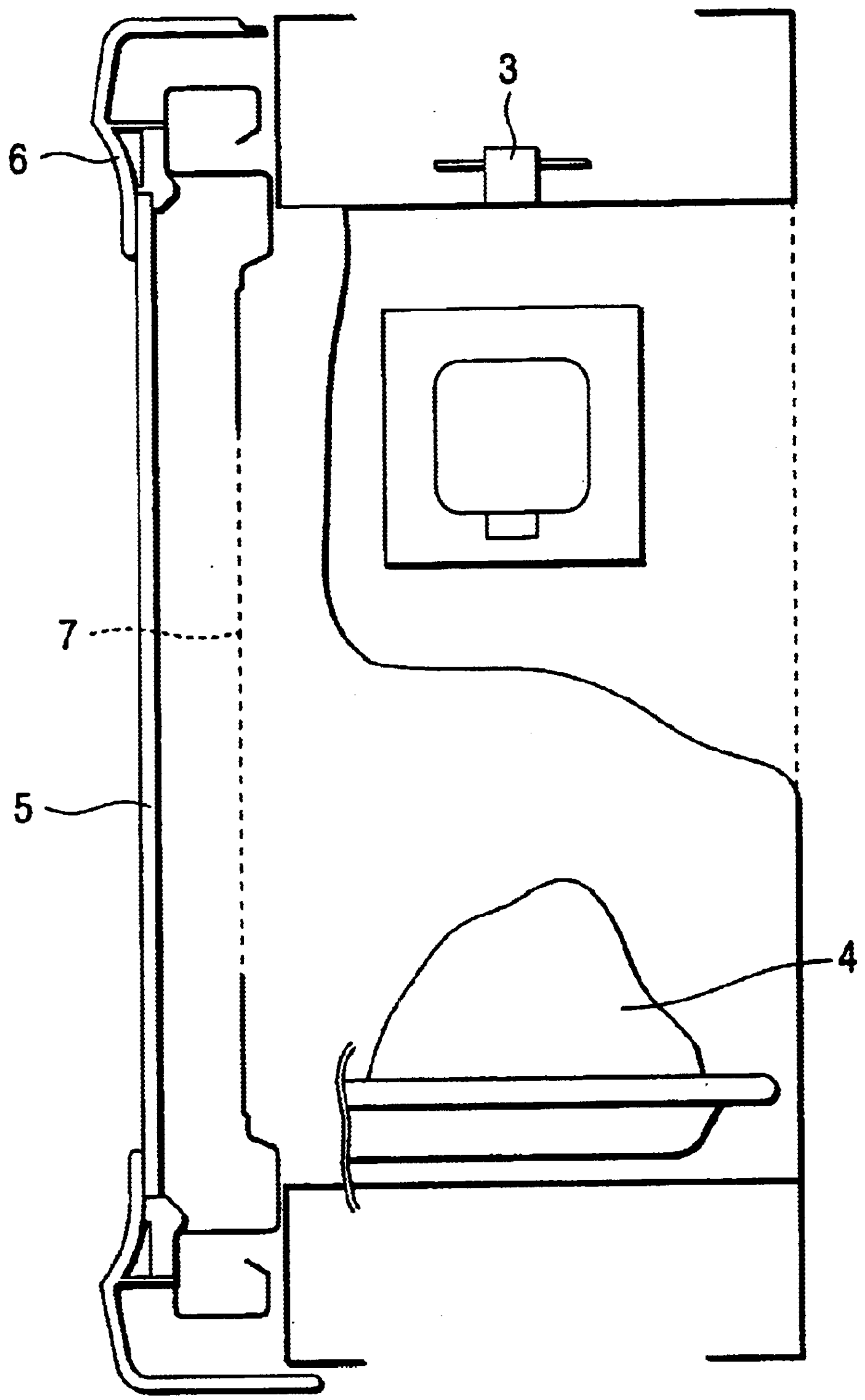
FIG. 5 PRIOR ART
FIG. 5 is a sectional view of main parts of the conventional cooking apparatus.

FIG. 1 is a perspective view of a cooking apparatus according to one embodiment of the present invention. FIGS. 2 and 3 are sectional views of main parts of the cooking apparatus.

In the drawings, a door main body 2 is provided on the front surface of a heating chamber 1. In the door main body 2, a protective screen 5 made of glass is provided and fixed to the door main body 2 by a window frame 6 to prevent foreign materials from entering the heating chamber 1 to cause a failure. The door main body 2 is provided with a peephole part 7, which is formed at a conductive material such as metal plates to reflect microwaves, to recognize the state of a material 4 to be cooked in the heating chamber 1. The door main body 2 allows the peephole part 7 to come near to the protective screen 5 by a drawn part 11. For example, in one embodiment of the present invention, the distance between the peephole part or peep window part 7 and the protective screen 5 is set to 1 mm. The distance between the upper end 12 of the protective screen and the upper end 13 of the peephole part is longer than the distance between the protective screen 5 and the peephole part 7. In the one embodiment of the present invention, the former is, for instance, 20 mm.

A heating unit 14 such as magnetron is attached so as to heat the material 4 to be cooked in the heating chamber 1. A circuit for supplying electric power to the heating unit 14 is opened and closed by door switches 8*a* and 8*b*. On the wall surface of the heating chamber 1, a door switch holding unit 9 for holding the door switches 8*a* and 8*b* is provided. On the other hand, to the door main body 2, a door switch operating unit 10 is attached so as to freely slide. The cooking apparatus is operated only when the door main body 2 is closed. A heat sensitive part 15 is provided in the door switch holding unit 9. When the material 4 to be cooked ignites, the heat sensitive part 15 is deformed to move the position of the door switch 8*b* downward in the drawing. The heat sensitive part 15 is made of polypropylene and formed in a protruding shape. Thus, the material and form of the heat sensitive part 15 are set so that the heat sensitive part is thermally deformed at the temperature lower than the temperature at which the protective screen 5 begins to be thermally deformed.

Now, an operation of the cooking apparatus will be described below. The protective screen 5 is made of glass having a high heat resisting property. Since the peephole part 7 is provided near the protective screen 5, the distance between the peephole part 7 and the protective screen 5 is adequately small. Accordingly, as soon as flame enters this space, oxygen in the space necessary for combustion is consumed. Further, since the distance between the peephole and the protective screen is small, the supply of oxygen from a periphery can be delayed. Further, since the heat resisting temperature of the protective screen 5 is high, a situation that the protective screen is broken to supply oxygen necessary for combustion does not arise. Therefore, even when the material 4 to be cooked ignites, the flame hardly goes outside from the peephole part 7.

Further, since the flame goes outside with difficulty and the supply of oxygen to the heating chamber 1 as well as to the space between the peephole part or peep window part 7 and the protective screen 5 can be delayed, the combustion of the material 4 to be cooked in the heating chamber 1 can be stopped. A temperature switch 3 does not need to be provided. The cooking apparatus can be designed irrespective of the temperature of the heating chamber 1 under an ordinary heating state and upon ignition of the material 4 to be cooked.

Since the distance between the upper end 12 of the protective screen and the upper end 13 of the peephole part is 20 mm and longer than the distance of 1 mm between the protective screen 5 and the peephole part 7, the supply of oxygen into this space can be delayed. Additionally, heat can be prevented from being transferred to the protective screen 5 as well as other parts such as the window frame 6. Consequently, the heat resisting temperature of the window frame 6 does not need to be raised and the apparatus is easily designed.

The heat sensitive part 15 is made of polypropylene and formed in the protruding shape. Thus, the material and form of the heat sensitive part are set so that the heat sensitive part begins to be thermally deformed at the temperature lower than the temperature at which the protective screen 5 begins to be thermally deformed. Accordingly, when the material 4 to be cooked continues to be baked for a relatively long time, the door switch 8*b* can open the circuit to stop the operation of the cooking apparatus.

As described above, according to the present invention, the heat resisting temperature of the protective screen is higher than the heat resisting temperature of the window frame and the peephole part is provided near the protective screen. Accordingly, even when the material to be cooked ignites, the flame hardly goes outside from the peephole part. Further, since the temperature switch does not need to be provided in the heating chamber, the apparatus can be advantageously effectively designed with ease.

What is claimed is:

1. A cooking apparatus comprising:

a heating chamber for housing a material to be cooked;

a door main body attached to the heating chamber so as to freely open and close;

a peephole part provided in the door main body to recognize a state of the material to be cooked in the heating chamber;

a protective screen provided to prevent foreign materials from entering the heating chamber through the peephole part; and a window frame for fixing the protective screen to the door main body, wherein the protective screen has heat resisting temperature higher than that of the window frame and is provided near the peephole part.

2. A cooking apparatus according to claim 1, wherein at least the part that the protective screen is superposed on the peephole part is partly longer than a space between the protective screen and the peephole part.

3. A cooking apparatus comprising:

a heating chamber for housing a material to be cooked;

a door main body attached to the heating chamber so as to freely open and close;

a peephole part provided in the door main body to recognize the state of the material to be cooked in the heating chamber;

a protective screen provided to prevent foreign materials from entering the heating chamber through the peephole part;

a window frame for fixing the protective screen to the door main body;

a heating unit for heating the material to be cooked;

door switches for opening and closing a circuit for supplying electric power to the heating unit;

a door switch holding unit for holding the door switches to the heating chamber;

a door switch operating unit attached to the door main body so as to freely slide and a heat sensitive part provided in the door switch holding unit, wherein when the material to be cooked ignites, the heat sensitive part is deformed more earlier than at least either the protective screen or the window frame to operate the door switches and stop the heating unit.

4. A cooking apparatus as claimed in claim 3, wherein the heat sensitive part is made of polypropylene and formed in the protruding shape.

* * * * *